W. S. COSTIGAN

June 6, 1933. SPRING STRUCTURE Re. 18,860

3 Sheets-Sheet 1

Original Filed Feb. 2, 1928

INVENTOR.

W. S. Costigan,

BY

ATTORNEY.

W. S. COSTIGAN

June 6, 1933. SPRING STRUCTURE Re. 18,860

3 Sheets-Sheet 2

Original Filed Feb. 2, 1928

INVENTOR.

W. S. Costigan,

BY

ATTORNEY.

W. S. COSTIGAN

June 6, 1933. SPRING STRUCTURE Re. 18,860

3 Sheets-Sheet 3

Original Filed Feb. 2, 1928

INVENTOR.

W. S. Costigan,

BY

ATTORNEY.

Reissued June 6, 1933 Re. 18,860

UNITED STATES PATENT OFFICE

WESLEY S. COSTIGAN, OF HILLSDALE, MICHIGAN, ASSIGNOR TO REYNOLDS SPRING COMPANY, OF JACKSON, MICHIGAN

SPRING STRUCTURE

Original No. 1,846,848, dated February 23, 1932, Serial No. 251,370, filed February 2, 1928. Application for reissue filed August 4, 1932. Serial No. 627,542.

This invention relates to spring structures.

One object of the invention is to provide a spring embodying rows of springs with flexible strips to separate the adjacent rows of springs with the strips connected at their upper and lower edges to the top and bottom coils of the springs to normally hold the springs under a predetermined compression to maintain an effective thickness of the spring structure and operating to limit the recoil of the springs upon expansion incident to compression of the compressed springs.

Another object of the invention is to provide a spring structure for automobile or other seats embodying rows of springs with strips of fabric or other suitable material arranged to form partitions between the adjacent rows of springs, separating the rows, and connected to the springs to hold the springs under a given compression and operating to limit the recoils of the springs incident to expansion subsequent to compression of the springs in use and thereby preventing the rider from being thrown upwardly off of the spring seat structure.

A still further object of the invention is to provide a resilient soft spring cushion seat for automobiles and the like embodying such characteristics as to provide easy and comfortable riding for the occupant and to prevent a complete compression of the springs incident to abnormal jars and thereby prevent the rider from striking the bottom of the structure and by reason of means connecting the tops and bottoms of the springs to limit recoil thereby preventing the rider from being thrown off the seat against the top of the car in the event of jar due to uneven roadways.

It is still further designed to provide a spring structure wherein the springs are arranged in rows between flexible partition strips of suitable material which separate the rows and are connected at their edges to the top and bottom coils of adjacent rows and operating to control the height of the springs according to the width of said strips so as to control the thickness of the structure and the recoil of the springs.

With the above and other objects in view, the invention consists in the construction and novel combination and arrangement of parts hereinafter described, illustrated in the accompanying drawings, and set forth in the claims hereto appended, it being understood that various changes in the form, size, and minor details of construction may be resorted to without departing from the spirit of the invention or sacrificing any of the advantages thereof.

Figure 1:
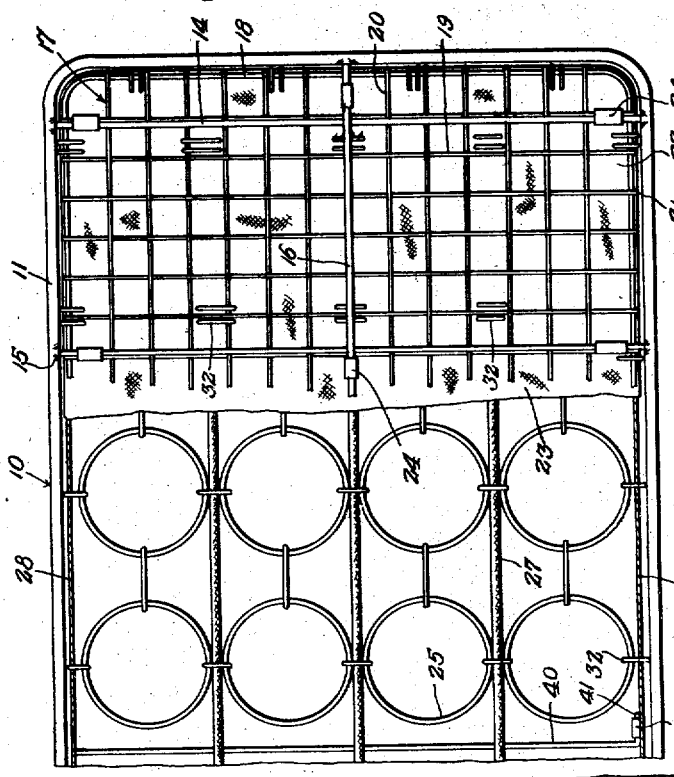
Fig. 1 is an inverted plan view, the fabric being broken away.

Referring now more particularly to the accompanying drawings, the reference character 10 indicates a base frame of sheet metal provided with a continuous inner groove 11 and a continuous outer groove 12 adapted to receive a wood insert to which the lower edge of the usual upholstery skirt (not shown) may be secured by tacking. Any other suitable type of base frame may be employed.

Supporting wires 14 transversely disposed and spaced apart have their ends connected to the base frame 10, and in the base frame shown, said ends are disposed in said inner groove in which they may be secured by compressing or pinching one of the walls of the inner groove at the point of connection of the wires with said groove as shown at 15. A longitudinally disposed supporting wire 16 intersects with the transverse wires 14 and the ends thereof may be secured in the said inner groove 11 in the same manner as the ends of the wires 14.

A spring supporting reticulated frame 17 is mounted within the base frame and has the same shape or contour thereof and is maintained slightly spaced from the inner walls of the base frame. This reticulated frame is preferably of metal and composed of a border wire 18 and wavy or slightly kinked transverse wires 19 intersecting and interlaced with similarly formed longitudinal wires 20 both of which have their ends secured to the border wire, and as shown these ends are bent around the border wire 18 as indicated at 21. The wires 19 and 20 of each set are disposed relatively close together to provide an open framework having relatively small openings 22. Thus, there is provided a lattice or open framework or spring support in which the open work may obviously be formed of strips of sheet metal instead of wires.

A sheet of burlap or other fabric or suitable material 23 is disposed over the top of the reticulated frame 17 and clipped or secured thereto in any suitable manner. The transverse and longitudinal wires 19 and 20 are connected to the aforesaid supporting wires 14 and 16 by means of suitable fastenings 24 whereby to secure the covered reticulated frame to the wires 14 and 16 and maintain the reticulated frame within the base 10 and slightly spaced from the latter and provide a substantial support for the body springs 25 of the structure.

The body springs 25 are illustrated as being of double cone knotted type but they may be unknotted or knotted or cylindrical or barrel or other suitable type. They are arranged in rows relatively close together and have their base coils resting directly upon the aforesaid burlap or other covering material 23 so that by reason of the interposed soft material 23 between the springs and the reticulated frame the rubbing or contact between the metal springs and metal reticulated frame is prevented by the said soft material 23 which acts as a silencer to prevent noise incident to metallic contact between the springs and said frame. Thus, it will be understood that the body springs have their base coils disposed directly upon the burlap or other suitable soft material 23.

Figure 3:
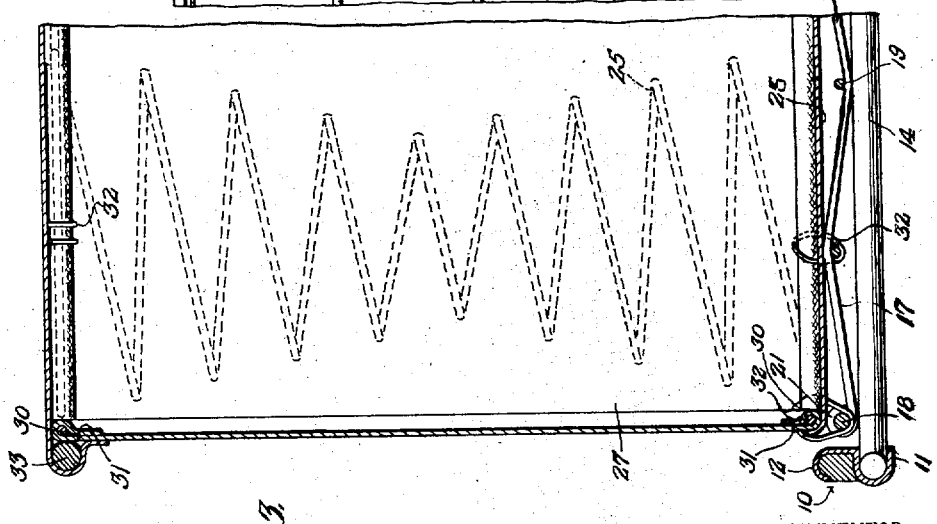
Fig. 3 is an enlarged fragmentary longitudinal sectional view.
Figure 2:
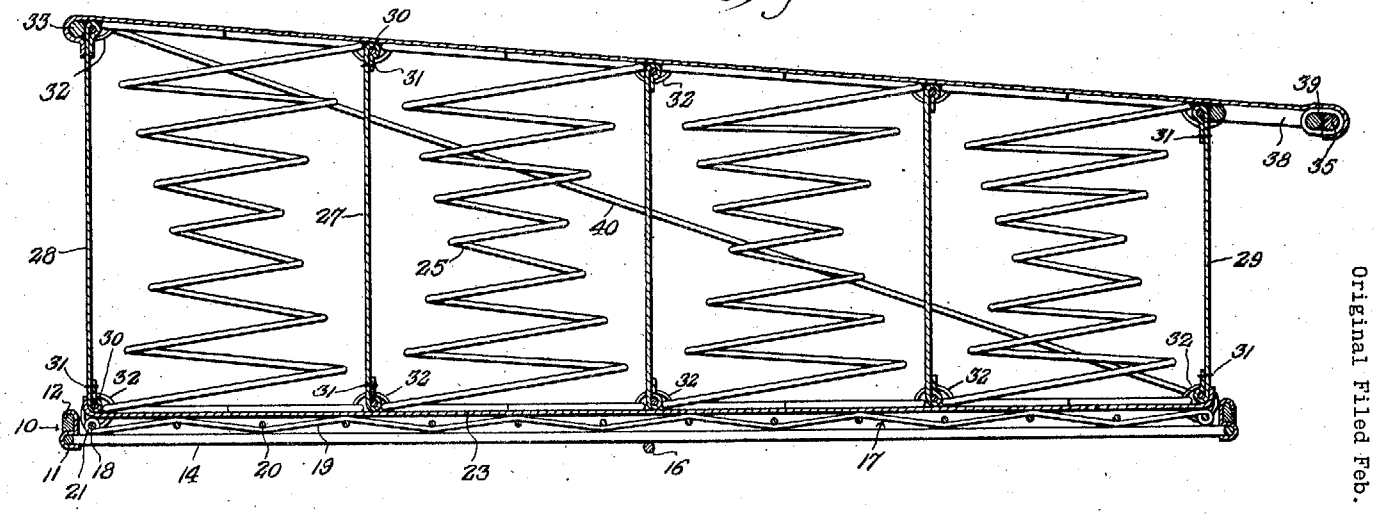
Fig. 2 is an enlarged transverse sectional view of the structure.
Figure 6:
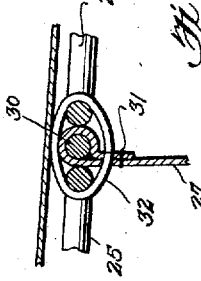
Fig. 6 is an enlarged detail sectional view showing the connection of one of the intermediate partitions with the upper coils of adjacent springs.
Figure 5:
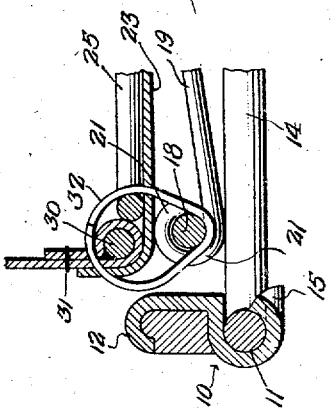
Fig. 5 is an enlarged detail sectional view of one lower corner of the spring structure.
Figure 4:
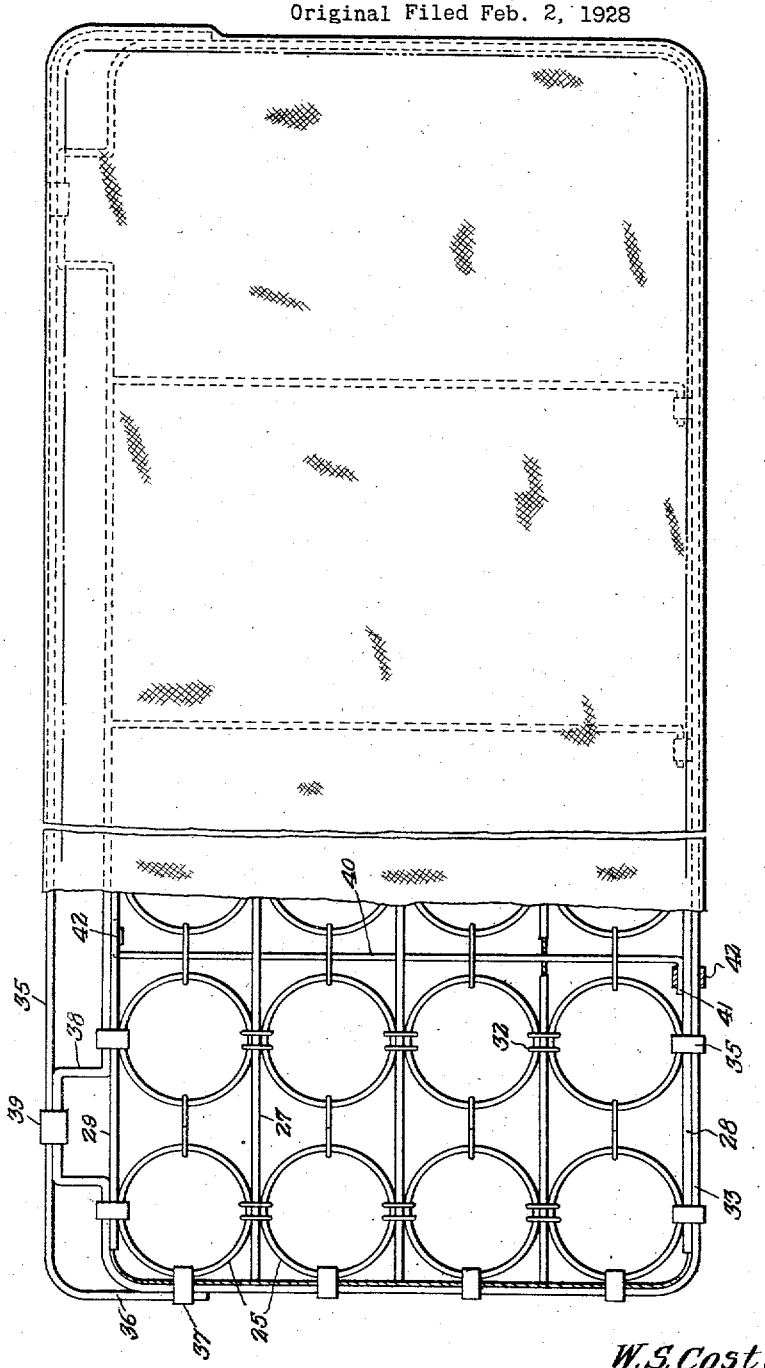
Fig. 4 is a plan view with parts broken away.

A strip of burlap or other suitable fabric or material 27 is arranged between rows of springs 25. There is front burlap or other strip 28 and a rear burlap or other strip 29 both of which cooperate with the aforesaid strips 27 for the purpose of controlling the effective height of the body springs and the thickness of the structure and to prevent recoil of the springs beyond a predetermined limit. To these ends, the strips 27, 28 and 29 have a width determined by the length of initially compressed springs and have their longitudinal edges connected to the top and bottom coils of the body springs. More specically, as illustrated, each flexible strip 27, 28 and 29 has its opposite longitudinal edges folded over a longitudinal light gauge wire reinforcement 30 which may be retained in the respective fold by stitches, as at 31. Suitable fastening devices 32 connect the upper and lower reinforced edges of the strips 27, 28 and 29 to the top and bottom coils of the springs. The fastening devices 32 also secure the upper and lower reinforced edges of the border strips 28 and 29 to the border frame 18 of the reticulated frame and to the upper border wire 33; the strips 27 located between adjacent springs 25, as well as the wires reinforcing their upper edges, are unconnected from the upper border 33, as shown in Figs. 3 and 4, to permit the same to follow the flexure of the adjacent springs. The reinforced edges of the strips are secured to the coils of the spring after the springs have been initially compressed the desired degree, and the strips maintain this initial compression of the springs and thereby govern or control the thickness of the cushion and operate to limit recoil of the springs to prevent an occupant of the seat from being thrown upwardly into the top of the car incident to jars due to uneven roadways as well as preventing undue stress or wear upon the outer covering or usual upholstery finishing material. There is no friction between the partition strips and the springs which does away with unnecessary wear on the fabric strips due to the firm connection of the strips with the springs.

One edge of the top of the border frame 33 is extended outwardly. For instance, a wire 35 has its ends bent, as at 36, and connected to the upper border wire 33 by means of suitable clips 37, the border wire 33 having loops 38 which extend outwardly to the wire 35 and connected to the latter by means of suitable clips 39, as shown.

If desired, the structure may be braced by braces 40, each of which has bent ends 41. The braces preferably extend diagonally from top to bottom of the structure, passing through the partitions 27. The upper bent end 41 of each brace or stay 40 is connected preferably to the upper frame by means of suitable clips 42. The lower bent end of each brace or stay is preferably connected to the border wire of the reticulated frame.

Prior to placing the finishing upholstery material (not shown) on the structure it is preferable to close the top and ends of the structure with burlap or other suitable material as shown.

What is claimed is:

1. In a spring structure, a base frame including a marginal element having an inwardly opening longitudinal groove, transversely disposed wires spaced apart and having their ends fitted in said groove and punched therein, a longitudinally disposed supporting wire intersecting said transverse wires and having its ends fitted in the groove of the base frame and pinched therein, a reticulated spring supporting frame disposed within the base frame and mounted on said longitudinal and transverse wires and supported thereby, a fabric covering disposed on said reticulated frame, means piercing said fabric covering and embracing portions of the reticulated frame to secure said covering to the reticulated frame, and springs mounted on said fabric covering and secured to said reticulated frame.

2. In a spring structure, a base frame, an upper frame, rows of springs arranged within and between said frames, certain of said springs constituting border springs, strips of fabric of less height than the normal expansion of said springs arranged between adjacent rows of springs engaging the springs only upon two sides, members reinforcing the longitudinal edges of said strips of which at least the upper members are flexible, fastening means securing said members to said springs to place the same under compression, said upper members having sufficient flexibility to permit substantially individual action of the springs and permitting substantially individual action between said upper frame and the springs within the border springs.

3. In a spring structure, a base frame, an upper frame, rows of springs arranged within and between said frames, certain of said springs constituting border springs, strips of fabric of less height than the normal expansion of said springs arranged between adjacent rows of springs engaging the springs only upon two sides, flexible members reinforcing the longitudinal edges of said strips, fastening means securing said members to said springs to place the same under compression, said members and strips cooperating to definitely position said springs within said upper frame relative to each other and having interconnections with said upper frame of a character enabling substantially individual action between said upper frame and the springs within the border springs.

4. In a spring structure, a base frame, an upper frame, rows of springs arranged within and between said frames, strips of fabric of less height than the normal expansion of said springs arranged between adjacent rows of springs engaging the springs only upon two sides, flexible members reinforcing the longitudinal edges of said strips, fastening means securing said members to said springs to place the same under compression, said flexible members being unconnected with said upper frame at least at one end whereby the same may follow the flexure of said springs.

5. In a spring structure, a base frame, an upper frame, rows of springs arranged within and between said frames, strips of fabric of less height than the normal expansion of said springs arranged between adjacent rows of springs engaging the springs only upon two sides, flexible members reinforcing the longitudinal edges of said strips, fastening means securing said members to said springs to place the same under compression, said strips and members being unconnected at least at one end with said upper frame whereby the flexure of said springs is followed by said strips and members independent of the upper frame.

6. In a spring structure, a base frame, an upper frame, rows of springs arranged within and between said frames, strips of fabric of less height than the normal expansion of said springs arranged between adjacent rows of springs engaging the springs only upon two sides, wire members reinforcing the longitudinal edges of said strips of which at least the upper members are flexible, fastening means piercing said strips and embracing said members securing said strips to said springs to place the same under compression, said means fixedly engaging said strips and slidably embracing said members, whereby said springs are spaced longitudinally of the structure by said strips and have substantially individual action.

In testimony whereof I hereunto affix my signature.

WESLEY S. COSTIGAN.

4

CERTIFICATE OF CORRECTION.

Reissue No. 18,860. June 6, 1933.

WESLEY S. COSTIGAN.

It is hereby certified that error appears in the printed specification of the above numbered patent requiring correction as follows: Page 2, line 128, claim 1, for "punched" read "pinched"; and that the said Letters Patent should be read with this correction therein that the same may conform to the record of the case in the Patent Office.

Signed and sealed this 15th day of August, A. D. 1933.

M. J. Moore.

(Seal) Acting Commissioner of Patents.